United States Patent [15] 3,689,077
Ohira [45] Sept. 5, 1972

[54] OPERATION DEVICE FOR CASSETTE TYPE TAPE RECORDER

[72] Inventor: Tsunehisa Ohira, Sagamihara, Japan

[73] Assignee: Victor Company of Japan, Limited, Yokohama, Japan

[22] Filed: Sept. 24, 1969

[21] Appl. No.: 860,595

[30] Foreign Application Priority Data

Sept. 26, 1968 Japan ......................43/69158
Oct. 25, 1968 Japan ......................43/92606

[52] U.S. Cl. ............................274/4 E, 179/100.2 Z
[51] Int. Cl. .........................G11b 23/38, G11b 15/04
[58] Field of Search ........274/4 A, 4 B, 4 C, 4 E, 4 F, 274/11 A, 11 B, 11 C; 179/100.2 Z; 242/197–200

[56] References Cited

UNITED STATES PATENTS

| | | | |
|---|---|---|---|
| 3,248,066 | 4/1966 | Andrews | 74/242 |
| 3,037,093 | 5/1962 | Nowlan | 274/4 C UX |
| 3,484,110 | 12/1969 | Takemi | 274/4 G |
| 3,488,058 | 1/1970 | Staar | 274/4 E |
| 3,495,835 | 2/1970 | Laa | 179/100.2 Z X |
| 3,524,651 | 8/1970 | Ketzer | 179/100.2 Z X |

*Primary Examiner*—Leonard Forman
*Assistant Examiner*—Dennis A. Dearing
*Attorney*—Holman and Stern

[57] ABSTRACT

In a tape recorder of a cassette loading type, an operation device comprising a first lever having a projection for engaging with a notch for the reproducing operation on the side of the cassette and a second lever sliding in engagement with said first lever to prevent the erroneous operation of a recording push button in the reproducing mode of the tape recorder.

5 Claims, 6 Drawing Figures

INVENTOR.
TSUNEHISA OHIRA
BY Holman, Glascock, Downing & Seebold
ATTORNEYS

Patented Sept. 5, 1972 3,689,077

2 Sheets-Sheet 2

INVENTOR.
TSUNEHISA OHIRA
BY Holman, Glascock, Downing & Seebold
ATTORNEYS

OPERATION DEVICE FOR CASSETTE TYPE TAPE RECORDER

This invention relates to an operation device for a cassette type tape recorder and more particularly to an operation device for a cassette or a cartridge of the tape recorder adapted to avoid error in operation during the recording or reproducing operation upon loading a cassette or a cartridge in the tape recorder.

Generally when a cassette or a cartridge including a supply reel wound with a magnetic tape and a takeup reel is loaded in a tape recorder for reproducing operation, if a recording operation button is pushed by mistake, the tape recorder will present a recording mode and actuate an erasing head to undesirably erase the signals recorded on the tape. Therefore it was required to provide a safety mechanism to avoid such an operational mistake by which the reproducing mode may erroneously be converted to the recording mode and consequently erase the already recorded signals on the tape upon loading the cassette in the recorder.

This invention provides an operation device of the construction in which a safety mechanism is provided for avoiding such erroneous operation of the tape recorder in accordance with the above requirement.

A primary object of the present invention is to provide an operation device for a cassette type tape recorder having a safety means to avoid the erroneous and mistaken operation which will undesirably erase the already recorded signals on the tape upon loading of a cassette tape in the tape recorder for the reproducing operation.

Another object of the invention is to provide an operation device for a cassette type tape recorder which can set the recording or reproducing mode corresponding to the shape of part of the cassette casing.

A further object of the invention is to provide an operation device which can automatically set the recording operation button to a non-operative condition so as to prevent the erroneous operation when a playback cassette is loaded.

Still another object of the invention is to provide an operation device in which the recording operation button can be maintained in an operative condition of recording when a cassette loaded in the tape recorder is a cassette for recording.

Other objects and features of the invention will be apparent from the following description of the specification with reference to the accompanying drawings, in which.

Figures 1, 2:
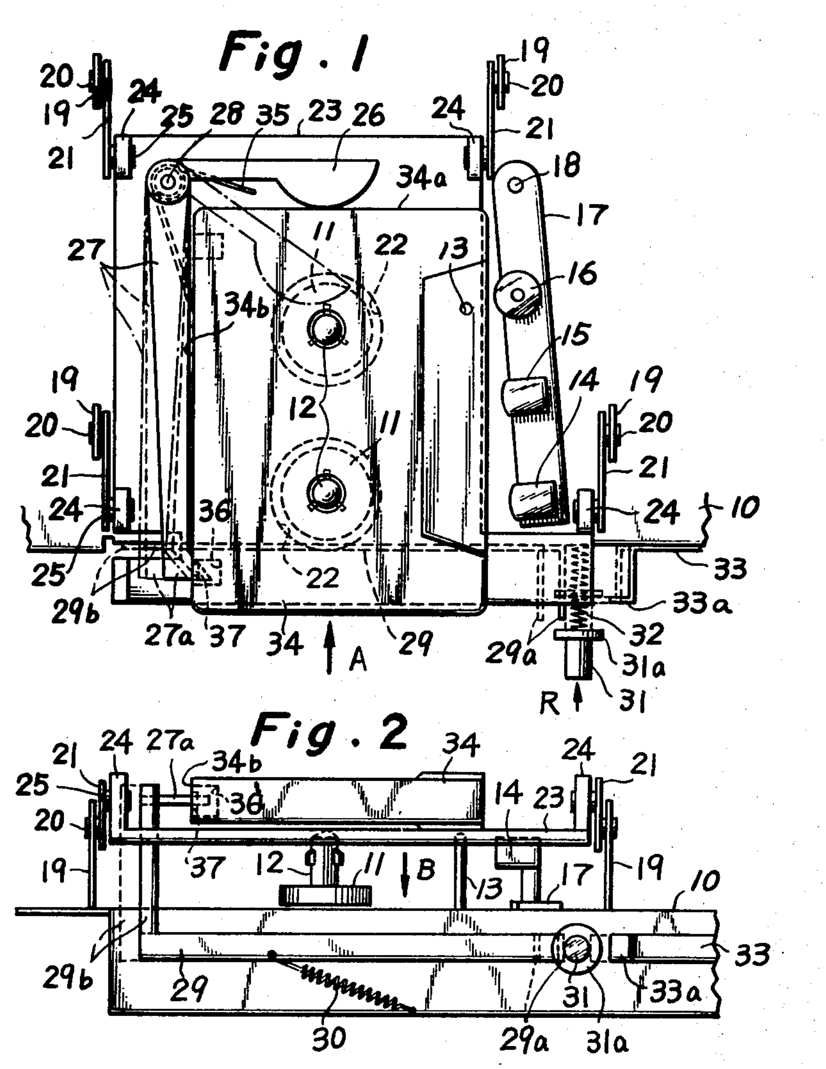
FIG. 1 is a plan view of an embodiment of the operation device according to the invention.
FIGS. 2 and 3 are front views respectively showing the action of the operation device.
Figure 3:
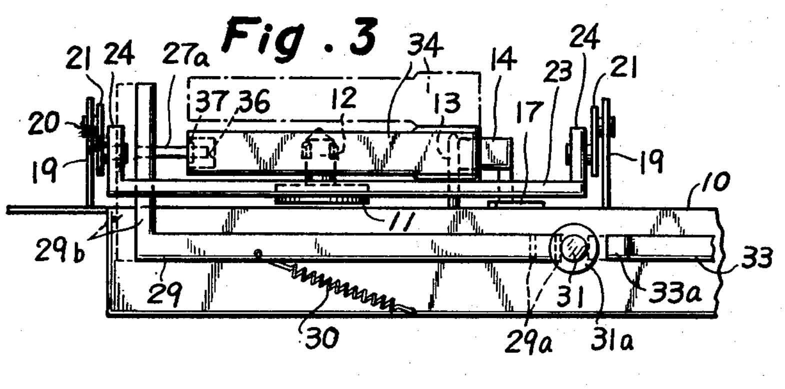

In FIGS. 1 to 3, a first embodiment of the operation device according to the invention is shown. Throughout the figures, a base plate 10 of the tape recorder is provided with two reel shafts 12 rotatably with reel disks 11 and a capstan shaft 13 erected upright and thrusted therethrough. Also on the base plate 10 is provided an arm member 17 rotatably about a shaft 18. The arm 17 has an erasing magnetic head 14 and a recording and reproducing magnetic head 15 both secured thereon and also a pinch roller 16 rotatably provided.

A cassette holder base 23 having holes 22 which may be fitted to the reel disks 11 is pivoted on shafts 25 by projections 24 on levers 21 which rotate respectively on shafts 20 of four brackets 19 erected on the base plate 10. A cassette rejecting lever 26 and a notch detecting lever 27 having a projection 27a at the forward end thereof are respectively rotatably provided on a shaft 28.

A compound L-shaped lever 29 having a first bent portion *29a* and a second bent portion *29b* engaging with the outside of the lever 27 is normally urged to slide rightwards by a spring 30 tensioned between the lever 29 and the base plate 10. A recording operation button 31 in normally projected by the force of a spring 32.

The operation of the above described device will be given in detail as the following.

In operation, the lever 26 is in a position as shown by a dot-and-chain line on FIG. 1 by force of a spring (not shown) when a cassette 34 is not provided on the holder base 23. The lever 27 also is in the dot-and-chain line position by force of a spring 35 provided between the lever 26 and the lever 27. .When the cassette 34 is inserted from the direction of an arrow A for loading on the holder base 23, the lever 26 is pushed by the front 34a of the cassette 34 and rotates counterclockwise. If the cassette 34 is completely loaded on the holder base 23 the lever 26 is moved to the most retracted position as shown by the full line. In the way of rotation of the lever 26 the spring 35 runs out of engagement with the lever 26. Thus the lever 27 is pushed by the bent portion 29b of the slide lever 29 and urged to turn rightwards by the tension force of the spring 30, and rotates counterclockwise, and the projection *27a* at its forward end contacts with the side *34b* of the cassette 34.

The cassette 34 has a notch 36 on the side 34b. The notch 36 normally has a cover 37 formed of a small piece. When the cassette 34 is used in a reproducing performance the cover 37 has to be previously removed before the cassette is loaded.

Operation of the device at the time of reproducing or playing back the cassette will now be described. After the cover 37 is removed the cassette 34 which has the opened notch 36 is pushed from the direction of the arrow A and loaded on the holder base 23 as shown in FIG. 2. With the movement of the cassette 34, the side *34b* of the cassette is contacted by the projection *27a* of the lever 27. If the cassette 34 is completely loaded as shown by in FIG. 1, the projection *27a* of the lever 27 rotated counterclockwise by the bent portion *29b* and fits into and engages with the notch 36 and the lever 27 is rotated to the position shown by the full line. Then the slide lever 29 moves to the position shown by the full line and its bent portion *29a* reaches to a position opposite to a flanged portion 31a of the button 31.

By a downward movement of the holder base 23 to a position shown in FIG. 3 in the direction of an arrow B, the cassette 34 is fitted with the capstan 13 and the reel shaft 12 is inserted into the reel hole of the reel contained in the cassette. When the tape recorder is set in a reproducing play mode, the arm member 17 rotates clockwise in association with the reproducing operation mechanism (not shown). The heads 14, 15 and the pinch roller 16 respectively partly fit into the cassette 34 and the heads 14 and 15 contact with the tape in the cassette 34. The pinch roller 16 compresses against the capstan 13 with the magnetic tape held therebetween, so that the cassette 34 is enabled a reproducing operation.

As the bent portion **29*a* of the lever 29 is positioned opposite to the flanged portion 31*a* of the recording operation button 31, the button 31 cannot be pushed further even if the operator should push the button 31 by error because the flanged portion 31*a* is in engagement with the forward end of the bent portion 29*a*. Therefore, the tape recorder will not present a recording mode but be maintained in a reproducing mode. Thus the signals recorded on the tape in the cassette 34 are not erased by the erasing head 14** at the time of recording mode.

Next, the operation of the device of this invention in the recording operation of the cassette 34 will be explained. In this case, the cover 37 of the cassette 34 is taken off. Similarly as described above, the cassette 34 which has the notch 36 closed with the cover 37 is placed on the holding base 23. Although the cassette 34 has not been completely loaded the projection **27*a* of the lever 27 is in engagement with the cover 37 as the notch 36 is not opened and the lever 27 is in a position shown by a broken line on the figure. Accordingly, the slide lever 29, the bent portion 29*b* of which is engaged with the lever 27, cannot slide to the right from the position shown by the broken line on the figure and the bent portion 29*a* does not reach the position opposite to the flanged portion 31*a* of the button 31**.

By pushing the button 31 in the direction of an arrow R against a force of a spring 32, said button is pushed to the position shown by the broken line. By a mechanism (not shown) in direct association with the pushing action of said button, a slide lever 33 is moved to the left, a bent end portion **33*a* pressing the flanged portion 31a of the button 31 and the button 31 is prevented from return to the initial position by force of the spring 32**, thereby retaining a recording condition.

If the tape recorder is set to a stopping mode, the lever 33 is moved slidably to the right initial position by that mechanism and the button 31 returns to the position as indicated by the initial full line by the force of the spring 32.

Figures 4, 5:
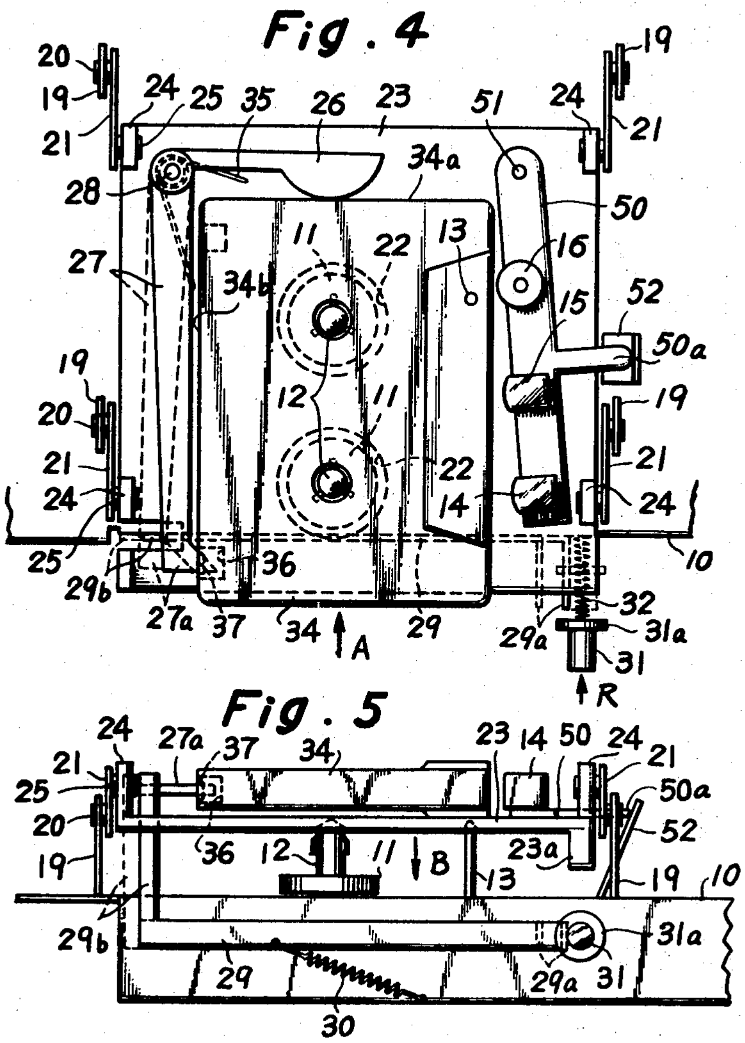
FIG. 4 is a plan view of another embodiment of the operation device according to the invention.
FIGS. 5 and 6 are respectively plan views of the above embodiment in each operational condition.
Figure 6:
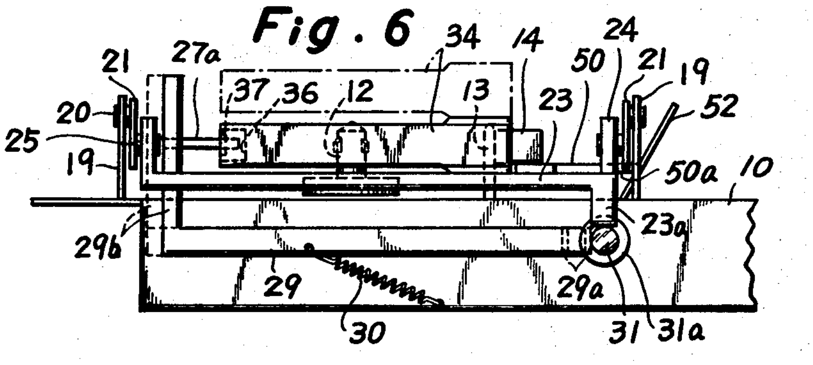

FIGS. 4 to 6 illustrate the second embodiment of the device according to the invention. Throughout the figures the same numerals designate the same members as in the first embodiment. A rotary arm 50 having heads 14 and 15 secured thereto and a pinch roller 16 rotatably provided thereon is rotatably mounted with a shaft 51 on the cassette holder base 23. The arm 50 has a projection **50*a* contacting with a bracket 52 obliquely mounted on the base plate 10. The holder base 23 has a bent portion 23*a*** projecting downwardly.

First, operation of the device in the reproducing play mode of the cassette 34 is described. The cassette 34 which has the open notch 36 and no cover 37 is loaded from the direction of the arrow A on the holder base 23 which is in a position moved upwardly as shown in FIG. 5. When the cassette 34 has been completely loaded as shown in FIG. 4 the projection **27*a* of the lever 27 fits into and engages with the notch 36 in a similar way as in the first embodiment and the lever 27 rotates to the position shown by the full line. At this instant the slide lever 29 also moves to the position as shown by the full line and its bent portion 29*a* reaches the position opposite to the flanged portion 31*a* of the button 31. Even if the operator should push the button 31 by error, the flanged portion 31*a* will be engaged with the forward end of the bent portion 29*a* so that the button 31 will no longer by moved by push and the tape recorder will not present a recording mode consequently causing no trouble of erasing recorded signals by the erasing head 14**.

Upon downward movement of the holder base 23 to the position of FIG. 6 in the direction of the arrow B, the projection **50*a* of the arm 50 contacts with the bracket 52 by such downward movement so that the arm 50 is rotated clockwise. Thus, when the holder base 23 is moved downward to the position shown in FIG. 6 the heads 14 and 15 will contact with the tape in the cassette 34, the pinch roller 16 contacting with the capstan 13**, and the cassette is in a reproducing position.

Operation of the device upon recording of the cassette 34 is explained below. The cassette 34 having the notch 36 closed by the cover 37 is placed on the holder base 23. As the notch 36 is not open even though the cassette 34 has been completely loaded, the lever 27 will be in the position as indicated by the broken line on the figure. Therefore, the slide lever 29 will not slide to the right from the position shown by the broken line on the figure. Also the bent portion **29*a* will not come to the position opposite to the flanged portion 31*a* of the button 31**.

By pushing the button 31 in the direction of the arrow R the button 31 is pushed to the position shown by the broken line. By the revolution of the lever 21 through a mechanism (not shown) in association with the action of the button 31 the holder base 23 is moved downwardly in the direction of the arrow B so that the arm 50, the projection **50*a* of which is in engagement with the bracket 52 is turned clockwise. When the holder base 23 is moved downwardly as seen in FIG. 6 its bent portion 23*a* comes into engagement with the flanged portion 31*a* of the button 31 which is being pushed, and is prevented from return to the initial position by the force of the spring 32**. Therefore the tape recorder is maintained in a recording condition.

This embodiment is designed so that the lever 27 may be at a retracted position to the left by the lever 26 through the spring 35, but it may be otherwise designed such that the lever 27 may be directly retracted by the lever 26. Throughout the above embodiments the reject lever 26 has been provided although it may be dispensed with. Furthermore, the recording operation button 31 may be connected to the slide switch so as the change over the recording mode and the reproducing mode in the amplifier circuit system.

While the invention has been described with respect to specific and preferable embodiments, various modifications and variations thereof will be apparent to those skilled in the art without departing from the scope of the invention.

What I claim is:

1. An operation device for a cassette recorder adapted to handle a tape cassette of the type having short sides, long sides and a notch in the long side, the notch being covered if the cassette is one to be recorded and being open if the cassette is one to be reproduced and played back, said device comprising:

a chamber means having an open end for receiving said tape cassette with the short side thereof inserted and loaded first;

a recording operation button adapted to be actuated to effect recording of the cassette;

a first lever pivotally mounted on said receiving means and biased toward contact with the long side of a cassette when said cassette is inserted, said lever having a portion thereon aligned with said notch of an inserted cassette;

a contact arm means disposed within said chamber means and coupled to said first lever, said arm means being contacted by said cassette when inserted into said chamber means so as to bias said first lever toward contact with said long side of said cassette;

said contact arm means biasing said first lever to pivot from a first position to a second position, said first position being a position wherein the first lever is out of contact with the cassette, and said second position being a position wherein the first lever is pivoted into contact with the long side of the cassette;

said first lever biased by said contact arm means being limited in its pivoting travel in the event that the notch in the long side of the cassette is covered and being allowed its full pivoting travel in the event that the notch is open;

a second lever slidably mounted on said receiving means and cooperably engaged with said first lever;

a biasing means for biasing said second lever to slide toward said recording operation button; and said second lever biased by said biasing means being slid to a position preventing actuation of the recording operation button in response to said full travel of said first lever.

2. The operation device as defined in claim 1, said first lever having a projection to be contacted with said cover on the notch of said cassette and inserted into said opened notch of said cassette, and wherein said second lever comprises a first bent portion for engaging with said first lever and a second bent portion for restricting said button from being pushed, said second lever receiving a sliding force in a direction for sliding to the position at which said second bent portion restricts said button from being pushed.

3. The operation device as defined in claim 2 wherein said button has a flanged portion, and said second bent portion is formed in a shape to oppose and restrict said flanged portion of said button when said projection of said first lever is inserted into said opened notch of said cassette whereby said second lever is slide 4. The operation device as defined in claim 1 which further comprises means for holding said button in a pushed state.

5. The operation device as defined in claim 1 wherein said cassette receiving part is a cassette holder base movable upwardly and downwardly and constructed so that said cassette is loaded on the upper surface of said base in its upwardly moved position and a reel shaft is inserted into said cassette when said base is moved downwardly, and which further comprises means for holding said button in a pushed state when said means is moved downwardly, said means moving upwardly and downwardly together with said cassette holder base.

* * * * *